US009810533B2

(12) United States Patent
Fosburgh et al.

(10) Patent No.: US 9,810,533 B2
(45) Date of Patent: Nov. 7, 2017

(54) RAILWAY TRACK MONITORING (75) Inventors: Bryn Allen Fosburgh, Longmont, CO (US); Mark Edward Nichols, Christchurch (NZ); Per Martin Holmgren, Boulder, CO (US); Nils Thomas Larsson, Boulder, CO (US)

(73) Assignee: Trimble Inc., Sunnyvale, CA (US)

( * ) Notice: Subject to any disclaimer, the term of this patent is extended or adjusted under 35 U.S.C. 154(b) by 1959 days.

(21) Appl. No.: 13/095,673

(22) Filed: Apr. 27, 2011

(65) Prior Publication Data
US 2012/0274772 A1 Nov. 1, 2012

(51) Int. Cl.
| H04N 7/18 | (2006.01) |
| G01C 7/04 | (2006.01) |
| B61K 9/08 | (2006.01) |
| B61L 23/04 | (2006.01) |
| B61L 25/02 | (2006.01) |
| G01C 11/04 | (2006.01) |

(52) U.S. Cl.
CPC .............. *G01C 7/04* (2013.01); *B61K 9/08* (2013.01); *B61L 23/041* (2013.01); *B61L 23/047* (2013.01); *B61L 25/026* (2013.01); *G01C 11/04* (2013.01)

(58) Field of Classification Search
CPC ....................................................... B61K 9/08
See application file for complete search history.

(56) References Cited

U.S. PATENT DOCUMENTS

| 3,816,927 | A | 6/1974 | Theurer et al. |
| 4,155,176 | A | 5/1979 | Goël et al. |
| 4,288,855 | A | 9/1981 | Panetti |
| 5,203,089 | A | 4/1993 | Trefouel et al. |
| 5,331,745 | A | 7/1994 | Jager |
| 5,568,152 | A | 10/1996 | Janky et al. |
| 5,598,782 | A | 2/1997 | Wiseman et al. |
| 5,642,285 | A | 6/1997 | Woo |
| 5,644,318 | A | 7/1997 | Janky et al. |
| 5,671,540 | A | 9/1997 | Davis |
| 5,760,415 | A * | 6/1998 | Hauck et al. ............ 250/559.33 |

(Continued)

FOREIGN PATENT DOCUMENTS

| DE | 19922321 C | 11/2000 |
| EP | 1931945 B1 | 6/2008 |

(Continued)

OTHER PUBLICATIONS

Applanix (2009) "POS TG: Positional & Orientation Systemt for Track Geometry" Brochure, 4 pages.

(Continued)

*Primary Examiner* — Mohammed Rahaman
*Assistant Examiner* — Asmamaw G Tarko
(74) *Attorney, Agent, or Firm* — Swanson & Bratschun, L.L.C.

(57) ABSTRACT

Novel tools and techniques for monitoring railway track geometry. In one aspect, some such tools and techniques can determine a location of a platform along a railway, capture one or more images of the railway, and/or analyze the rail configuration at that point. In another aspect, some solutions might employ photogrammetric techniques to analyze the rail configuration and thereafter store data about the rail configuration, perhaps correlated with the location of the images, in a data store.

26 Claims, 5 Drawing Sheets

(56) References Cited

U.S. PATENT DOCUMENTS

| | | | |
|---|---|---|---|
| 6,147,598 | A | 11/2000 | Murphy et al. |
| 6,282,362 | B1 | 8/2001 | Murphy et al. |
| 6,347,265 | B1 | 2/2002 | Bedaud |
| 6,415,522 | B1 | 7/2002 | Ganz |
| 6,634,112 | B2 | 10/2003 | Carr et al. |
| 6,804,621 | B1 | 10/2004 | Pedanckar |
| 7,081,824 | B2 | 7/2006 | Gilbert |
| 7,164,975 | B2 | 1/2007 | Bidaud |
| 7,339,611 | B2 | 3/2008 | Marold et al. |
| 7,463,348 | B2 | 12/2008 | Chung |
| 7,502,670 | B2 | 3/2009 | Harrison |
| 7,541,974 | B2 | 6/2009 | Scherzinger |
| 7,610,152 | B2 | 10/2009 | Meyer |
| 7,619,561 | B2 | 11/2009 | Scherzinger |
| 7,697,127 | B2 | 4/2010 | Glimm |
| 7,719,467 | B2 | 5/2010 | Norda |
| 2005/0125142 | A1 | 6/2005 | Yamane |
| 2006/0244830 | A1* | 11/2006 | Davenport et al. ........... 348/148 |
| 2008/0195257 | A1* | 8/2008 | Rauch ............... 701/1 |
| 2009/0138233 | A1 | 5/2009 | Kludas et al. |
| 2009/0220144 | A1 | 9/2009 | Mein et al. |
| 2009/0262974 | A1 | 10/2009 | Lithopolous |
| 2009/0267827 | A1 | 10/2009 | Allison |
| 2010/0026551 | A1* | 2/2010 | Szwilski et al. ........... 342/22 |
| 2010/0141759 | A1 | 6/2010 | Scherzinger |
| 2010/0157283 | A1 | 6/2010 | Kirk et al. |
| 2010/0172546 | A1 | 7/2010 | Sharp |
| 2010/0174507 | A1 | 7/2010 | Vogel et al. |
| 2014/0052387 | A1* | 2/2014 | Farritor et al. ........... 702/33 |

FOREIGN PATENT DOCUMENTS

| | | |
|---|---|---|
| EP | 1936323 A2 | 6/2008 |
| EP | 1944572 A1 | 7/2008 |
| WO | WO 2009/100773 A1 | 8/2009 |
| WO | WO 2009/100774 A1 | 8/2009 |
| WO | WO 2009/103342 A1 | 8/2009 |
| WO | WO 2009/106141 A1 | 9/2009 |
| WO | WO 2010/080950 A1 | 7/2010 |

OTHER PUBLICATIONS

Applanix (2009) "POS TG: Specifications" Flyer, 2 pages.
Applanix (2010) "POS TG" Web Site: http://www.applanix.com/products/land/postg.html, Accessed on: Jun. 14, 2010, 3 pages.
Ensco, Inc. (2009) "Track Geometry Measurement System" Flyer, 2 pages.
Ensco, Inc. (2009) "Laser Gage & Rail Profile Measurement Systems" Flyer, 2 pages.
Ensco, Inc. (2009)"ENSCO RailScan Lite Hi-Rail Gage System" Flyer, 2 pages.
Ensco, Inc. (2010), "Rail Surface and Wear Condition: Laser Gage & Rail Profile Measurement Systems," Web Site: http://www.ensco.com/Rail-Surface-Wear-Condition, Accessed: Jun. 14, 2010, 2 pages.
Ensco, Inc. (2010), "Track Geometry Measurement System," Web Site: http://www.ensco.com/Rail-Technologies/Track-Inspection-System, Accessed on: Jun. 14, 2010, 1 page.
IEEE Xplore (2010), "Automated Railroad Track Inspection," Web Site: http://ieeexplore.ieee.org/Xplore/login.jsp?url=http%3A%2F%2F . . . , Accessed on Jun. 14, 2010, 1 page.
Matisa (2009), "High Technology for Tamping Machines," Brochure, 12 pages.
Oberlechner et al. (2000), "GPS System to Boost Accuracy," International Railway Journal, Sep. 2000 Issue Reprint, 2 pages.
Sinning (2010), "GEDO CE More Precise. More Productive." Brochure, 9 pages.
Sinning (2010)"GEDO CE Track Documentation" Flyer, 2 pages.
Sinning (2008)"GEDO CE As-built situation survey and track documentation," Flyer, 2 pages.
U.S. Department of Transportation: Federal Railroad Administration (2004), "On-line High-speed Rail Defect Detection," Final Report—Part 1, 100 pages.
U.S. Federal Railroad Administration (2010), "Automated Track Inspection Program (ATIP) Statistics," Web Site: http://atip.fra.dot.gov/public/statistics/index.htm, Accessed on: Jun. 14, 2010, 1 page.
Wikipedia (2010), "Derailment," Web Site: http://en.wikipedia.org/wiki/Derailment, Accessed on: Jun. 15, 2010, 10 pages.
Zywiel et al. (2001), "Innovative Measuring System Unveiled" International Railway Journal, Sep. 2001 Reprint, 2 pages.

* cited by examiner

RAILWAY TRACK MONITORING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, monitoring railway track geometry, and more particularly, to tools and techniques for monitoring railway track geometry using captured images of the railway.

BACKGROUND

Rail transport (including without limitation, heavy rail, light rail, monorail, etc.) has been a staple of modern transportation world-wide for nearly 200 years. Aside from high capital costs, rail tends to be a very cost- and energy-efficient mode of transporting both people and cargo.

Typically a rail system will involve infrastructure, including a railway ("track") that comprises one or more (usually two or three) rails, which anchored on ties or other structural members to provide a consistent gauge (i.e., inter-rail distance) for the track. A set of one or more cars (which, when linked, are colloquially referred to as a "train") travel over the rails. Generally, each car has an undercarriage that is designed to travel on a specific gauge of track, and there are several standardized gauges of track.

The gauge (and other factors, such as relative elevation of each rail, shape of each rail, etc.) can be considered the "track geometry" or "rail configuration" of the railway. In most rail systems, the rail configuration must fall within specified tolerances, which are generally quite precise; if the track geometry falls outside those tolerances, there is a significant risk of railcar derailment, which often produces catastrophic results.

Accordingly, several different solutions have been proposed to ensure a satisfactory rail configuration. One such solution is manual inspection, but the relatively long distances involved in most railways render this solution unacceptably labor intensive and therefore impracticable. Another solution involves the use of mechanical sensors, which are generally mounted on special cars that travel the railway to monitor track geometry. More recently, optical solutions, which employ lasers to probe track geometry, have been proposed. The use of mechanical and/or optical sensors, however, can prove to be prohibitively expensive, and such solutions often require specialized hardware, traveling on specialized rail cars, reducing their utility further.

Hence, there exists a need for a relatively inexpensive, automated solution to the problem of track geometry monitoring.

BRIEF SUMMARY

This Summary is provided to briefly summarize a selection of concepts that are further described below in the Detailed Description of Certain Embodiments. This Summary is not intended to identify key or essential features of the claimed subject matter, nor is it intended to be used as an aid in determining the scope of the claimed subject matter. Accordingly, this Summary should be considered exemplary in nature, and not limiting in any respect.

Certain embodiments provide improved solutions for monitoring railway track geometry. In one aspect, tools and techniques provided by such embodiments can determine a location of a moving platform along a railway, capture one or more images of the railway, and analyze the rail configuration at that point. In another aspect, some embodiments employ photogrammetric techniques to analyze the rail configuration and thereafter store data about the rail configuration, perhaps correlated with the location of the images, in a data store. Optionally, if an unsatisfactory rail configuration is identified, the system might generate an alert to provide an indication of the unsatisfactory rail condition.

The tools provided by various embodiments include, without limitation, methods, systems, and/or software products. Merely by way of example, a method might comprise one or more procedures, any or all of which are executed by a system that might comprise a computer. Correspondingly, an embodiment might provide a system, including, in some cases, a computer configured with instructions to perform one or more procedures in accordance with methods provided by various other embodiments. Similarly, a computer program might comprise a set of instructions that are executable by a computer system (and/or a processor therein) to perform such operations to control the functionality of such a system. In many cases, such software programs are encoded on physical, tangible and/or non-transitory computer readable media (such as, to name but a few examples, optical media, magnetic media, solid state memory, and/or the like).

Merely by way of example, one set of embodiments provides methods of monitoring rail geometry and/or railway configuration. An exemplary method might comprise capturing, with a first image capture device mounted on a mobile platform configured for movement along a railway comprising one or more rails, a series of position reference images as the mobile platform travels along the railway. The method might further comprise identifying, in at least one position reference image, a visual target positioned proximate to the railway, and/or determining a distance from the mobile platform to the visual target. In an aspect of some embodiments, the method further comprises calculating, at a computer system, a location of the mobile platform on the railway, based at least in part on the determined distance from the mobile platform to the visual target.

The method might also include capturing, with a second one or more image capture devices, one or more railway images of the one or more rails, and/or performing, at the computer system, photogrammetric analysis on at least one of the one or more rail images to identify a rail configuration of the railway. In some embodiments, the method includes associating the rail configuration with the location of the mobile platform on the railway, and/or storing, in a data store, a data record comprising data about the rail configuration and the associated location of the mobile platform.

Another exemplary method might comprise determining a location of a mobile platform configured for movement along a railway comprising one or more rails, and/or capturing, with a first one or more image capture devices, one or more railway images of the one or more rails. The method might further comprise performing, at the computer system, photogrammetric analysis on at least one of the one or more rail images to identify a rail configuration of the railway. In some embodiments, the method comprises associating the rail configuration with the location of the mobile platform on the railway, and/or storing, in a data store, a record comprising data about the rail configuration and the associated location of the mobile platform.

Another set of embodiments provides railway monitoring systems. An exemplary system might comprise a computer system, including one or more processors, and a computer readable medium in communication with the one or more processors. The computer readable medium might have encoded thereon a set of instructions executable by the computer system to perform one or more operations, including without limitations to perform operations in accordance with the methods of various embodiments, such as the methods described above, to name one example.

For instance, the set of instructions might include instructions for identifying, in at least one position reference image captured by a first image capture device mounted on a mobile platform configured for movement along a railway comprising one or more rails, a visual target positioned proximate to the railway. In some cases, the set of instructions might further include instructions for activating an electronic distance measurement system, based on an identification of the visual target, to measure a distance from the mobile platform to the visual target, and/or instructions for calculating a position of the mobile platform, based at least in part on the measured distance from the mobile platform to the visual target. There might also be instructions for performing photogrammetric analysis on one or more rail images, captured by a second one or more image capture devices, to identify a rail configuration of the railway. In some cases, the set of instructions further comprises instructions for associating the rail configuration metric with the location of the mobile platform on the railway, and/or instructions for storing, in a data store, a record comprising data about the rail configuration and the associated location of the mobile platform.

In some cases, the system might further include additional hardware elements, such as a mobile platform configured for movement along a railway comprising one or more rails. Other hardware might comprise a first image capture device, mounted on the mobile platform, for capturing a series of position reference images as the mobile platform travels along the railway, and/or a second one or more image capture devices for capturing one or more railway images of the one or more rail. In some cases, the system might comprise an electronic distance measurement system for measuring a distance from the mobile platform to a visual target positioned proximate to the railway, and/or a data store for storing railway configuration data.

Another set of embodiments provide apparatus. An exemplary apparatus might comprise a computer readable medium having encoded thereon a set of instructions executable by one or more computers to perform one or more operations. In some cases, the set of instructions will cause the computer system to operate in accordance with the method(s) provided by one or more embodiments, such as the methods described above. Merely by way of example, the set of instructions might be similar to the set of instructions described above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

One set of embodiments provides tools and techniques for monitoring the rail configuration of a railway. Merely by way of example, in some embodiments, these tools and techniques can determine a location of a moving platform along a railway, using any of a variety of location determination techniques. Certain embodiments provide the ability to capture one or more images of the railway. These images might then be analyzed to identify the rail configuration at the determined location. Other embodiments may be configured to store data about the rail configuration, perhaps correlated with the determined location, in a data store. In some cases, embodiments might generate an alert if the rail configuration is determined to be unsatisfactory.

In one aspect, certain embodiments may employ advanced image analysis techniques, including without limitation, edge detection and/or photogrammetry, to undertake an automated determination of whether a given location's rail configuration is satisfactory. Advantageously, this sort of image processing can allow solutions to be produced with lower cost and/or higher reliability than conventional, sensor-based systems. Merely by way of example, some have proposed using cameras in conjunction with laser projections within the cameras' fields of view to provide reference guides to allow photo interpretation; others have proposed the use of expensive and unreliable physical sensors to detect track anomalies. In accordance with some embodiments, the use of photogrammetry allows a camera as the only sensing hardware necessary to analyze track geometry, eliminating the need for expensive and/or unreliable sensors, laser-photo systems, and/or the like.

Additionally and/or alternatively, such solutions can be implemented on a variety of platforms, including both specialized monitoring cars as well as in-services locomotives (or other in-service rail cars). In fact, some embodiments can be deployed on platforms that are not rail-bound at all, so long as the platform allows the system to identify a location along the railway and obtain sufficient imagery of the rail(s) to allow image processing to be performed. Thus, particular embodiments can provide far more flexibility than conventional solutions.

Figure 1A:
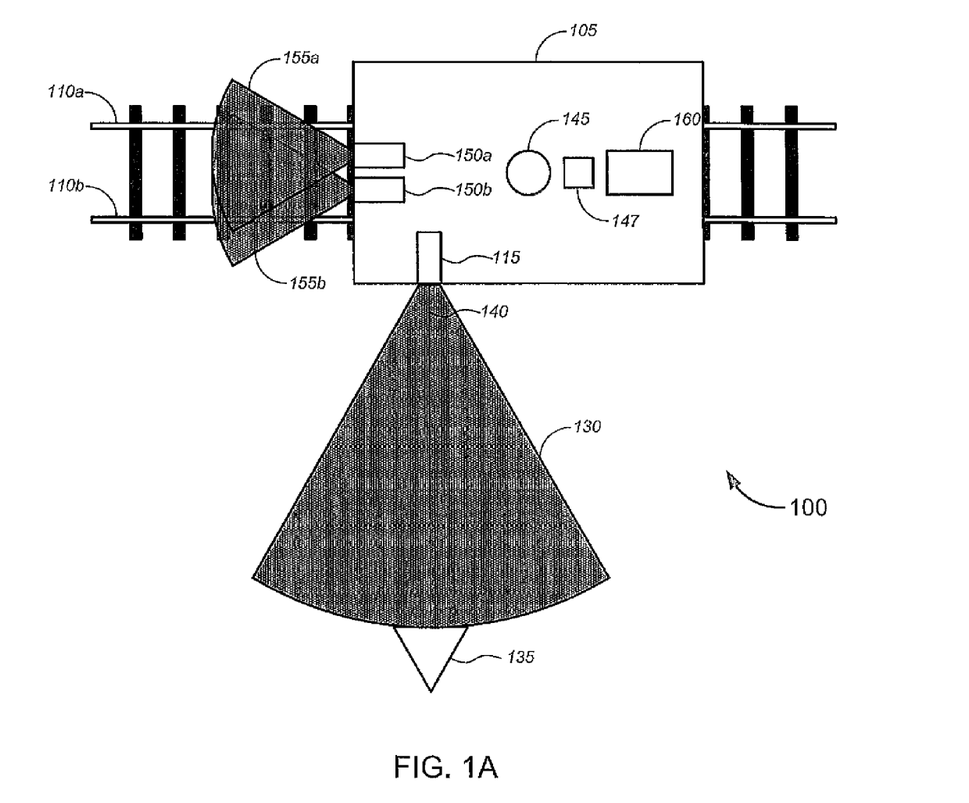
FIGS. 1A and 1B illustrate a system for monitoring railway track geometry, in accordance with various embodiments.
Figure 1B:
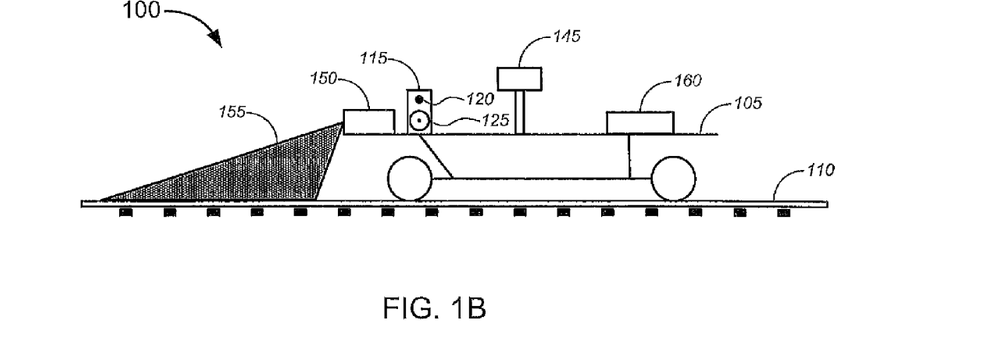

FIGS. 1A and 1B illustrate a system 100 that can be used for railway track monitoring, and more specifically, for monitoring rail configuration. (FIG. 1A illustrates a plan view of the system 100, while FIG. 1B illustrates an elevation view of the same system. The reader should note that the figures are provided only to illustrate various novel features and for ease of description, and that, accordingly, neither FIG. 1A nor FIG. 1B is drawn to scale.) The system 100 comprises a mobile platform 105, which, in some cases, is configured for movement along a railway, which might comprise one or more rails 110. In accordance with various embodiments, the railway may comprise any number of rails 110 of any gauge and/or geometry, although, as illustrated, a typical railway will comprise two rails 110a and 110b whose inter-rail spacing is specified by one of a number of standard gauges.

As illustrated, the mobile platform 105 is configured to travel along the rails 110 in conventional fashion (i.e., through frictional contact between an undercarriage of the platform 105 and the rails themselves), although as described above, this is not required. In other embodiments, for example, the mobile platform 105 might travel over, alongside, and/or above the rails 110 (e.g., as a road-going and/or an airborne platform). As used herein, therefore, the term, "travel along a railway," should be interpreted to include these modes of travel, as well as any other mode of travel that enables the mobile platform 105 to perform the monitoring functions described herein.

In a particular embodiment, the mobile platform 105 comprises a conventional locomotive and/or railcar, which, in some aspects may be an in-service car (e.g., a railway car, which can include a locomotive, that is performing its normal function with transporting cargo, people, and/or the like, or providing traction for such transport cars). In other embodiments, the mobile platform 105 might comprise a purpose-built railcar, a service car, a self-propelled (or non-self-propelled) wheeled platform, and/or the like. In an aspect of some embodiments, the mobile platform 105 can be any structure or device that can accommodate the other components of the system 100 and can travel along the railway. (Of course, it should be noted as well that certain embodiments might employ one or more stationary platforms that, other than lacking independent mobility, could operate in similar fashion to the system 100.)

In the illustrated embodiment, the system 100 further comprises a position determination system 115, which is configured to determine a position of the mobile platform 105 (and/or of a specific portion of the mobile platform 105 and/or one or more other components of the system 100). The position determination system might employ one or more of any of a variety of technologies to determine the position of the mobile platform 105 at a particular time.

Merely by way of example, in some cases, the position determination system 115 includes an image capture device 120 (e.g., a digital still camera and/or video camera) and/or a distance measurement system 125. In one set of embodiments, the image capture device 120 captures a series of one or more images of at least a portion of the surrounding landscape (referred to herein as "position reference images") as the mobile platform 105 travels along the railway. In an aspect, the image capture device 120 has a field of view (illustrated on FIG. 1A using numeral 130), and the image capture device 120 captures a series of images, each comprising that field of view 130, as the mobile platform 105 travels along the railway.

In some embodiments, the system comprises one or more visual targets 135 positioned along the railway. In an aspect, the locations of these visual targets 135 may be known to within a desired degree of precision. Thus, as the image capture device 120 captures images, those images are analyzed to identify the visual target 135 in the image. In accordance with one embodiment, when a visual target 135 is identified within a captured image, the system 100 activates the distance measurement system 125, which, in some cases, might be a laser-based electronic distance measurement ("EDM") system familiar to those skilled in the art, which emits a beam 140 of (visible or invisible) light, which might be directed based on the location in the captured image of the identified visual target. The visual target 135, which can comprise a prism or other reflective surface, reflects the beam 140, which is received by the distance measurement system 125, which can then calculate the distance from the mobile platform 105 (or, more particularly, the distance measurement system 125) to the visual target 135. Given the known location of the visual target 135, the known path of the railway, and the known distance from the distance measurement system 125 to the visual target, the location of the position determination system 115 (and, by extension, of the mobile platform 105 and/or any other component of the system 100 whose location is known relative to that of the position determination system 115) can be determined.

Additionally and/or alternatively, the position determination system 115 might comprise one or more of various other devices that can assist in position determination, including without limitation compasses or other direction finding devices, gyroscopes or other inertial position measurement devices, and/or the like, input from which can be used to further calculate a position solution. In a particular embodiment, the position determination system might include a global navigation satellite system ("GNSS") device 145, which includes a receiver that can receives signals from one or more navigation satellites and which can derive, from those signals a position solution. (As used herein, the term "GNSS," should be interpreted broadly to including global position system ("GPS") technology and any other global or regional satellite system, such as the Japanese quasi-zenith satellite system ("QZSS"), to name one example.) In some cases, the GNSS device 145 can be used on its own for position determination. In other cases, the GNSS device 145 might be used in conjunction with other devices (such as the image capture device 120 and/or distance measurement system 125) to obtain more precise positional solutions. In a particular embodiment, position determination system 115 might be used in conjunction with an inertial measurement unit ("IMU") 147, which can provide position solutions based on dead reckoning from a known location, which might be determined by a GNSS fix, by image reference as described above, etc.

In a set of embodiments, the system 100 also comprises one or more image capture devices 150 configured to capture imagery of the rails 110 (referred to herein as "railway images") and/or surrounding features. (In some cases, the image capture device(s) 150 might comprise the image capture device 120 described above, but in other embodiments, the image capture device(s) 150 are a separate set of image capture devices. The image capture device(s) 150 can be any device (e.g., a digital still or video camera) that are capable of capturing one or more images of the rails 110 sufficient to allow for the image processing described below. In an aspect, the image capture device(s) 150 have a collective field of view that includes each rail 110 whose configuration is to be monitored. In one aspect, the image capture device(s) have a field of view that will capture an image of the rails at a known distance (usually relatively proximate) from a leading or trailing edge of the mobile platform 105.

In the illustrated example, the system 100 includes two image capture devices 150*a* and 150*b* (in addition to the image capture device 120), although different embodiments may have more or fewer image capture devices 150 for capturing railway images. In an aspect, the system 100 might have a sufficient number of image capture devices 150 (which might be one device 150 or any plurality of devices 150) to obtain a sufficient number of images of the same section of rails 110 to allow for photogrammetric analysis. The number of images required might depend, for example, on the photogrammetric techniques used, the quality and/or resolution of the images, the availability (or non-availability) of size reference markers in the image(s), and/or the like.

In some cases, an image capture device 150 will be selected to have a field of view tailored to allow an image of the monitored rail(s) to occupy the entire field of view (or substantially the entire field of view), to allow for greater pixel density in the area of interest and therefore more precise photogrammetric analysis when measuring linear and/or angular separation and the like. Merely by way of example, track gauge interior spacing generally ranges from 1 to 1.676 meters, worldwide. For lens configured to view to the outer edges of a pair of the widest gauge tracks, the Indian gauge of 1.676 meters, and an off-the-shelf charge coupled device ("CCD") imaging system with a resolution of 3000×4000 pixels (forming a 12 Megapixel array), with the CCD configured to have the most pixels oriented to span the track gauge interior width, the number of millimeters per pixel will be 1676/4000=0.419 mm. With sub-pixel interpolation, the resolution can be increased by a factor of 10, to 0.042 mm per pixel. Thus, sub-millimeter accuracy is made possible at high speeds for automatic monitoring and data collection. Special-purpose CCD imagers can be made with aspect ratios other than 3×4, and larger spans beyond 4000 pixels are available today. For example, 24 Megapixel imagers are available, thus increasing the raw accuracy to 0.22 mm/pixel.

In a set of embodiments, one or more image capture devices (e.g., devices 120 and/or 150) can be used to provide position determination measurements as well. Merely by way of example, as described in further detail below, an image capture device 150 could be used to capture imagery of rails (or other terrain features) and, based on the captured imagery, determine movement of the platform 105. That movement could then be used to calculate a position (relative to a known position, which might be determined using one or more of the techniques described above) of the platform 105 and/or a given point thereon.

The system 100 further comprises a computer system 160 in communication with the position determination system 115 and/or the image capture devices 120, 150. Such communication might take any of a variety of forms. Merely by way of example, in some cases, the computer system 160 might have an Ethernet connection to the other system components; in other cases, the components might communicate wirelessly (e.g., using any of the protocols specified by the IEEE 802.11 suite of standards) or via a serial (e.g., Universal Serial Bus) connection. One skilled in the art will appreciate that a variety of different communication facilities could be used to provide communication between the computer system 160 and the other components of the system 100.

The computer system 160 provides control functions for the other systems and performs data collection and/or analysis. In an aspect, the computer system 160 might perform (or facilitate the performance of) any of the image analysis and/or position determination operations described herein, using data supplied by other system components. Thus, in some cases, the computer system 160 might transmit collected data, including without limitation position data, captured imagery, and/or the like, to a remote computer system (using any of a variety of standard or proprietary data transmission media and/or techniques, such as cellular or other wireless communication, satellite communication, and/or the like). In other cases, the computer system 160 might perform such analysis locally. The computer system 160, an example of which is described in detail below, might be a special-purpose computer system or might be a general-purpose computer system programmed with software to perform the procedures described with respect to the methods below.

Figure 2:
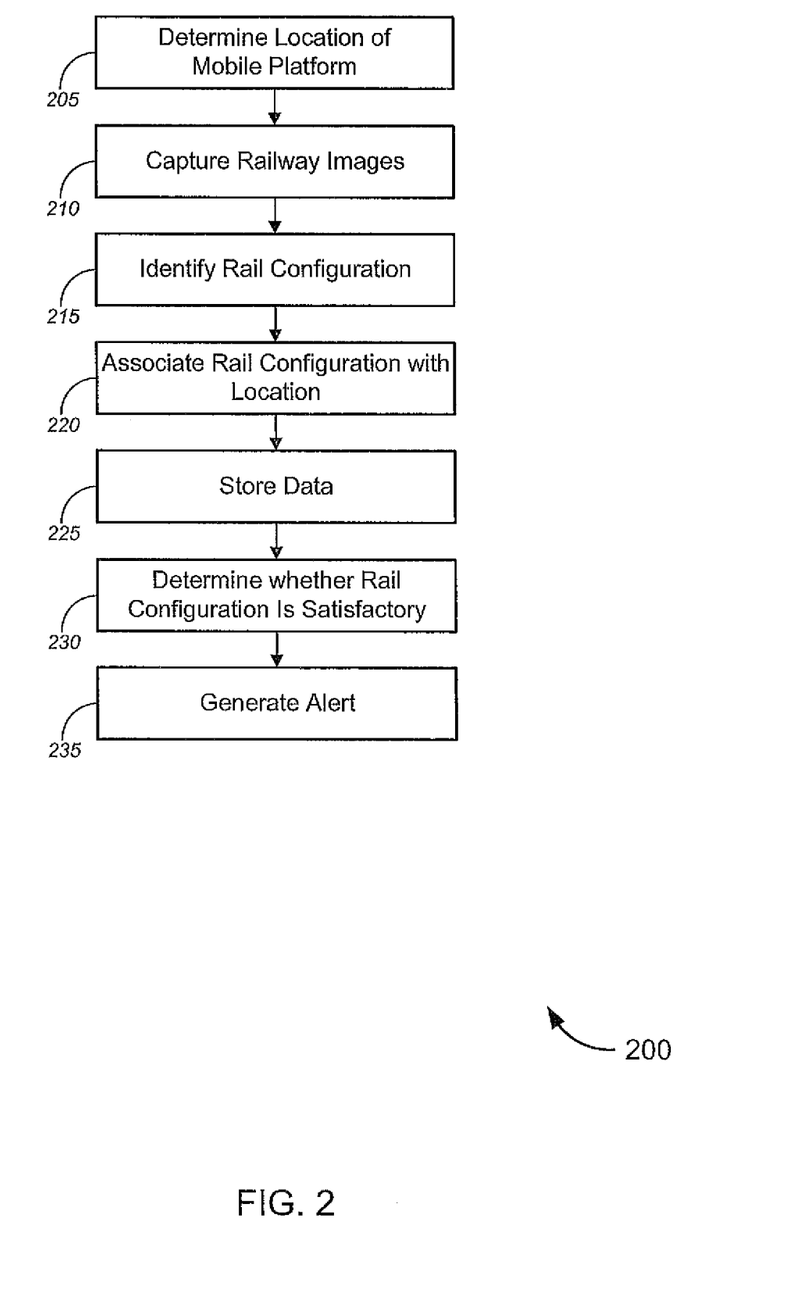
FIG. 2 is a process flow diagram illustrating a method of monitoring railway track geometry, in accordance with various embodiments.
Figure 3:
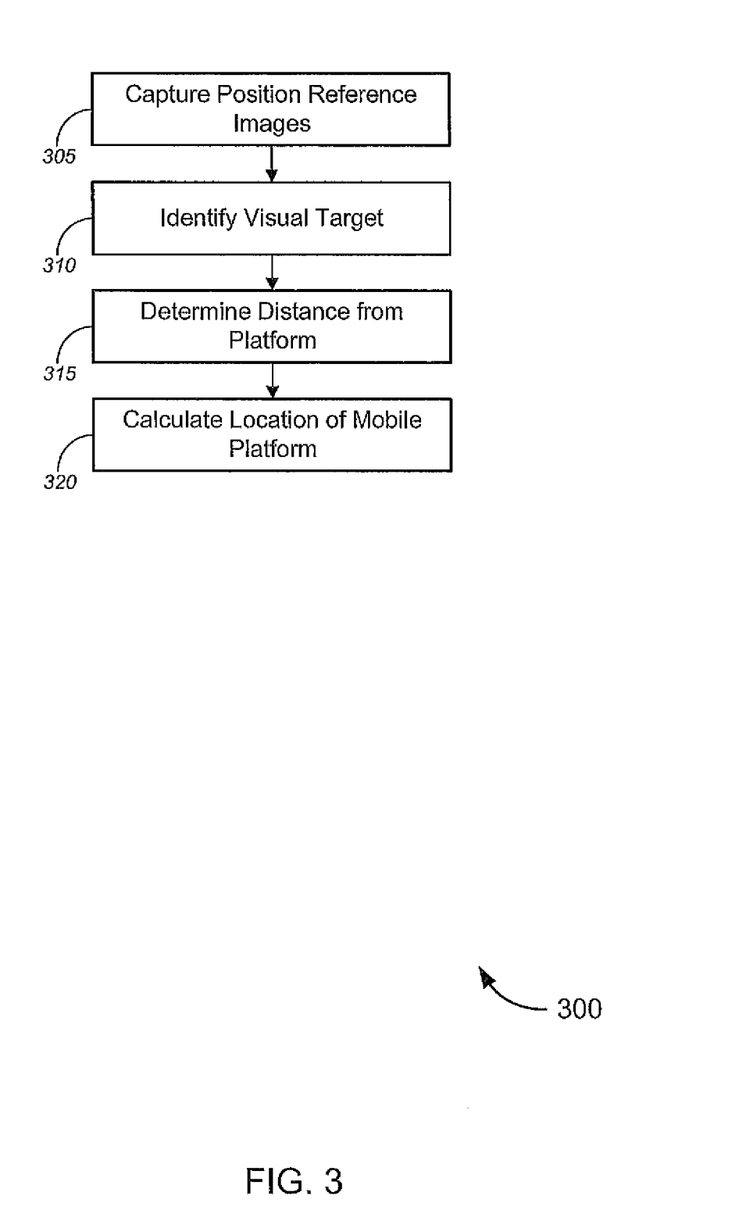
FIG. 3 is a process flow diagram illustrating a method of determining a location of a mobile platform, in accordance with various embodiments.
Figure 4:
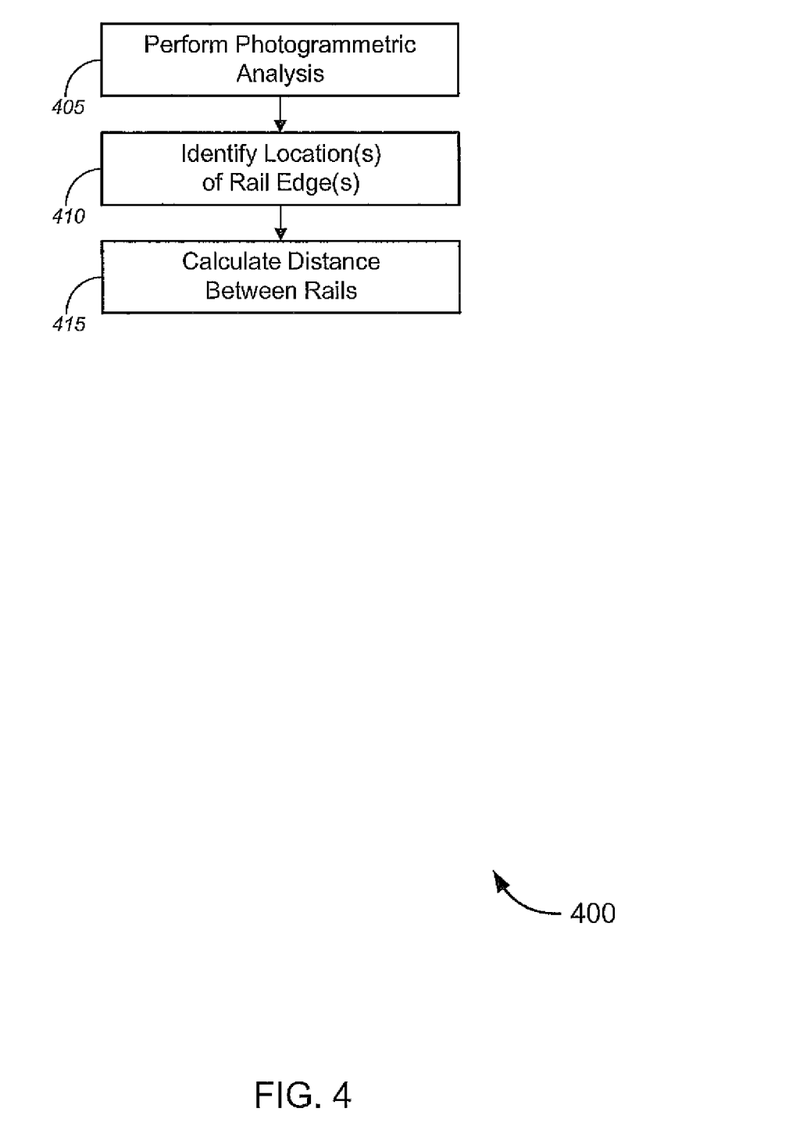
FIG. 4 is a process flow diagram illustrating a method of determining whether a rail configuration is satisfactory, in accordance with various embodiments.

FIGS. 2-4 illustrate various methods that can be used to monitor a rail configuration of a railway. While the methods of FIGS. 2-4 are illustrated, for ease of description, as different methods, it should be appreciated that the various techniques and procedures of these methods can be combined in any suitable fashion, and that, in some embodiments, the methods depicted by FIGS. 2-4 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2-4 can be implemented by (and, in some cases, are described below with respect to) the system 100 of FIG. 1 (or components thereof), these methods may also be performed with any suitable hardware implementation. Similarly, while the system 100 of FIG. 1 (and/or components thereof) can operate according to the methods illustrated by FIGS. 2-4 (e.g., in accordance with particular described procedures, by executing instructions embodied on a computer readable medium), the system 100 can also operate according to other modes of operation and/or perform other suitable procedures.

FIG. 2, for example, illustrates a method 200 of monitoring a railway's track geometry. The method 200 describes procedures for monitoring a rail configuration at a particular point along a railway; it should be appreciated that the method 200 might be performed iteratively (at any appropriate frequency) to monitor track geometry along a length of the railway. In an aspect, the rate of capture of the images will be commensurate with the data needs of the railway manager. Capture rates can be given in terms of distance along the track, as in a measurement is made every 1 meter, or 10 meters, or at any other distance, and/or as a function of time, such as every 1/10 second, every second, every 10 seconds, and/or the like. The combination of the rate of travel (speed along the track) and the rate of image capture possible with the cameras of interest, will determine the shortest distance possible between measurements. Modern cameras can capture upwards of 24 frames (images) per second, with 10-14 Megapixel CCD imagers; at a modest speed of 100 km/hr, the distance between images being taken at 30 frames/second is under a meter.

The method 200 comprises determining a location of a mobile platform (block 205), such as the mobile platform 105 described above. There are a variety of ways in which the location of the mobile platform can be determined. Merely by way of example, if the system includes a GNSS device, the GNSS device can be used (in a known manner) to obtain a solution for the position of the mobile platform and or a target point associated with the mobile platform, for example by vector addition of the GNSS position solution and the distance from the GNSS receiver to the target point, which might be measured in advance and/or stored in the computer system. As used herein, a "target point" refers to any arbitrary point associated with the mobile platform, which can be considered the location of the mobile platform itself, for purposes of this disclosure.

For example, the target point might be the center of mass of the mobile platform, or it might be the location of the image capture device(s) used to capture the railway images. In some cases, the target point might not even be on the mobile platform itself. For example, the target point might be a point within the field of view of the image capture device(s) used to capture the railway images, such as a point that corresponds to a location on one of the rails within each railway image (e.g., a point on the track, in the middle of the track gauge, or any point that has an identifying feature, such as a tie, etc.). As used herein, the term "location of the mobile platform" can refer to any such target point, whether defined as a point on the mobile platform or a point in space relative to the mobile platform.

The target point can be geolocated by first geolocating a known point on the mobile platform (such as the location of a GNSS antenna or receiver, the location of an EDM system, or the location of any position-determination device) and deriving the location of the target point based on that known spatial relationship between the target point and that known point. Merely by way of example, known point on the mobile platform is the center of a GNSS antenna and the target point is the entrance pupil of one of the image capture devices used to capture the railway images, the distance (as a three-dimensional vector) between the center of the base of the image capture device and the center of the GNSS receiver can be measured a priori (using mechanical measurement, GNSS solutions obtained at the image capture device and the image capture device, etc.) and stored. Likewise, the distance (again, as a three-dimensional vector) between the base of the image capture device and the entrance pupil of the device can be obtained (e.g., through examination of the device, manufacturer's specifications, etc.) and stored, and these two vectors can be added (and the result stored) to produce a vector distance from the known point to the target point (i.e., the entrance pupil).

As another example, if the target point is a point within the field of view of the image capture device (e.g., a point on or near one of the rails in captured images), that location, relative to the known point (which can be geolocated using one of the position solutions described above) can be determined by photogrammetrically determining a three-dimensional distance vector from image capture devices' entrance pupil to the target point, and adding that vector to the distance vector from the known point to the entrance pupil. In this way the each feature in a captured railway image can be geolocated photogrammetrically by reference to the target point, allowing any improper rail configuration to be tracked with a great deal of precision.

FIG. 3 illustrates a method 300 that provides another example of a technique for determining the location of the mobile platform, in accordance with some embodiments. The method 300 comprises capturing a series of one or more position reference images (block 305). For example, in one embodiment, an image capture device continually and/or periodically captures images of (a portion of) the landscape surrounding the mobile platform, as the mobile platform travels along the railway. Some or all of such images may be selected (e.g., periodically on a specified frequency) for analysis to identify a visual target within the images. These selected images can be considered position reference images.

At block 310, the method 300 comprises identifying a visual target in at least one position reference image. In an aspect, the visual target might be positioned proximate to the railway; that is, the visual target might be positioned sufficiently proximate to the railway that it can be identified in a position reference image. Thus, the visual target might be positioned such that the view of the target from the railway is not obscured, and that it is close enough to the railway to allow the target to be detected in the captured image. In an aspect, the position of the visual target is known to within a necessary precision (e.g., based on an earlier surveying operation, by use of a GNSS receiver on the visual target, etc.). In many implementations, there may be a plurality of visual targets positioned at various points along a railway, and each visual target might be individually identifiable by the monitoring system (e.g., by a visual identifier that can be determined from a captured image of the visual target, by identifying information transmitted by radio signal to be received by the monitoring system, by general location, etc.).

Thus, in one embodiment, as the mobile platform travels along the railway, the image capture system captures position references images and the computer systems analyzes at lease some of those images using known techniques to identify a visual target in a particular position reference image. The system might identify the visual target generically, and/or it might identify a specific visual target based on the imagery (for example, if the visual target includes a visual identifier). In the former case, the computer system might use additional information to identify the visual target. For instance, the computer might use a GNSS solution for the location of the mobile platform to identify a visual target whose general location is known (e.g., by correlating the GNSS-based location of the platform with a database of visual target locations). As another example, the computer might be in communication with a receiver configured to receive identifying information via radio signal from the visual target; based on this identifying information, the visual target can be specifically identified.

In accordance with the method 300, once the visual target has been identified, a distance measurement system (such as an EDM) is activated, based (in some cases) on the identification of the target, and the distance measurement system is used to measure the distance from the platform (or, more precisely, from the distance measurement system) to the visual target. In some cases, the distance measurement system is aligned with and/or slaved to the image capture device, such that the distance measurement system is configured to focus on the visual target, based on the location of the visual target identified in the position reference image. For example, U.S. Pat. No. 6,035,254 to Nichols, the entire disclosure of which is incorporated by reference, discloses techniques for aligning a robotic total station with a visual target; similar techniques could be used to align a distance measuring system with a visual target in accordance with some embodiments. Likewise, International Publication No. WO 2007/031248 A1, filed Sep. 11, 2006 and entitled "Surveying Instrument and Method of Providing Survey Data Using a Surveying Instrument," the entire disclosure of which is incorporated herein by references, describes techniques that can be used to identify, in a visual image, a focus point for an EDM system. Similar techniques, and others, can be used to focus the distance measurement system on the visual target. Thus, the distance from the mobile platform (or an arbitrary "target point" thereon) to the target can be determined (block 315), for example, by adding (as a vector sum) the distance from the distance measurement system to the visual target to the distance (if any) from the distance measurement system to the desired target point on the mobile platform; this distance can be measured in advance and stored in the computer system.

Based on the known location of the visual target, the distance from the mobile platform (or, more precisely, the target point) to the visual target, and/or the known path of the railway (the mobile platform/target point being assumed to be on the path of the railway in most cases), the location of the mobile platform can be calculated (block 320). In some cases, these two pieces of data might be sufficient to calculate the location of the mobile platform; for example if the railway path is linear over the relevant span, those three pieces of data might be sufficient to calculate a unique solution for the location of the mobile platform. In other cases, additional data might be used to perform such a calculation. For example, an azimuth from the distance measurement system to the visual target could be measured (using a compass or any other direction measurement device), and that azimuth, coupled with the known location of the visual target and the distance from the mobile platform to the visual target, could be used to calculate the location of the mobile platform.

In other embodiments, movement of the platform (and/or a target point thereon) can be measured, and the movement of the platform/target point from a known location can be used to determine a current position of the platform. The "known location" of the platform/target point can be determined, as noted above, in a variety of ways, such as GNSS solutions, the method described in conjunction with FIG. 3, and/or the like. A variety of techniques can be used to determine movement of the platform/target point from such a known location, allowing for interpolation of position in between GNSS solution fixes, visual targets, and/or the like.

As one example, if the platform is equipped with an IMU, dead reckoning can be used to determine movement of the platform/target point. In other cases, photogrammetric analysis of imagery captured by one or more of the image capture devices can be used to determine movement of the platform/target point. Merely by way of example, provisional U.S. Patent Application No. 61/358,423, filed Jun. 25, 2010 by Soubra et al. and entitled, "Method and Apparatus for Image-Based Positioning," the entire disclosure of which is incorporated herein by reference, describes techniques (referred to herein as "image-based motion tracking") for identifying features in multiple captured images and determining movement of the image capture device based on those features. This technique can also be described as "reverse photogrammetry," in that, unlike normal photogrammetry (which infers the positions of features in captured images), this technique infers the position of the image capture device, based on the locations of features within the captured images. These, and similar, techniques, can be used to determine movement of a mobile platform (and/or target point thereon) in accordance with various embodiments.

Thus, in some embodiments, determination of the location of the platform/target point can comprise determining the location based on photogrammetric analysis of captured imagery of the track bed (including, but not limited to the rails themselves, railroad ties, other features of the railway, etc.) and/or surrounding landscape, determining the location based on inertial measurements, and/or any technique that includes determining relative position based on detection of platform movement. In some embodiments, the system might be configured to perform error correction periodically and/or in response to various triggers. Merely by way of example, in many movement-based position determination techniques, accumulated error can lead to incorrect determinations of position over time. Thus, in some cases, the system might be configured to compare the position determined through a movement-based determination technique with a position determined through another technique (e.g., GNSS, visual target distance measurement, etc.) to correct (either retroactively or proactively) any accumulated error introduced by the movement-based position solution.

Thus, there are a variety of ways by which the location of the mobile platform can be determined, and any suitable technique for determining the location of the mobile platform can be employed in accordance with different embodiments. In some embodiments, multiple techniques can be used to obtain position solutions for the location of the platform/target point, and two or more of these position solutions may be integrated, using, e.g., a Kalman filter, a least-squares analysis, etc., to obtain a blended position solution.

Returning to FIG. 2, the method 200 further comprises capturing one or more railway images of the rails(s) along which the mobile platform is traveling (block 210). In some embodiments, the image capture devices capture a digital still and/or video image in a conventional fashion. In an aspect, the computer system provides operating instructions to the image capture devices, thereby causing the image capture device(s) to capture one or more images. The computer system might be configured to activate the railway image capture devices based on a detected location of the mobile platform (which might be a location determined using one of the techniques above, or a different location, which might be selected as a location at which railway images should be captured, based on an additional technique, such as dead reckoning, travel time, etc., coupled with a previously-identified location). In other cases, railway images might be captured periodically, continually, or on demand (e.g., based on user input).

As noted above, there might be one or more image capture devices configured to capture railway images. Hence, capturing one or more railway images might comprise capturing multiple images simultaneously (or near-simultaneously), to allow for, e.g., stereoscopic imaging and/or stereoscopic image processing, as described in further detail below. In an aspect, capturing a railway image comprises capturing an image that shows corresponding portions of all rails that are to be monitored (e.g., an image that includes corresponding sections of both rails in a standard two-rail railway), so that, for example, relative positions of multiple rails (e.g., rail gauge, slope between rails, etc.) can be assessed through analysis of the image.

At block 215, the method 200 comprises identifying the rail configuration. Identifying the rail configuration can comprise any operations that monitor, analyze, and/or otherwise assess any aspect of the railway's track geometry at a given point along the railway. This can include, for example ensuring the integrity of a rail's shape, measuring inter-rail distance (gauge) between two or more rails, measuring the relative elevation or height of two or more rails, measuring a radius of a curved rail, and/or the like. A variety of techniques can be used to identify the rail configuration from the captured images. Merely by way of example, in some cases, the rail configuration can be identified by manual inspection of the captured images. Other embodiments may employ different techniques for identifying the rail configuration.

More efficiently, however, some embodiments allow for the automated identification of real configuration, for example based on photogrammetry techniques. FIG. 4 illustrates a method 400 of identifying a rail configuration using photogrammetry. The method 400 comprises performing a photogrammetric analysis on one or more captured images of one or more rails (block 405). A variety of techniques can be employed within the realm of photogrammetry to perform dimensional calculations based on the pixels within a captured digital image. Merely by way of example, stereophotogrammetry is a known technique whereby multiple (stereoscopic) images of the same scene can be used to derive dimensional information (in three dimensions) if the scale of the images is known. In accordance with various embodiments, two image capture devices might each capture an image of the same section of the rail(s) of the railway.

The scale of these images can be determined from the focal length of the image capture devices, if for example, the distance from the image capture devices to the imaged rails is known. This distance can be calculated based on the declination of the image capture devices (which generally are located on the mobile platform) and the distance from the image capture devices to the bottom surface of the wheels at the base of the mobile platform (assuming the mobile platform is configured to travel along the rails), so long as the declination of the image capture devices is sufficiently large that the bottom surface of the wheels (which rest on the rails) can serve as a proxy for the elevation of the rails in the scene captured by the image capture devices. Alternatively and/or additionally, the image capture devices may be calibrated (either before or after installation on the platform), for example by capturing an image of a scale (e.g., meter stick) and performing photogrammetric analysis on the capture image to determine a correlation between captured pixels and linear distance. The scale of the images can be determined in other ways as well, for example, by reference to features in the images themselves. Such features may be a graduated scale that is embedded in the railway bed, the width of the rails themselves (which can be assumed to be fairly constant in most cases), and/or the like.

Based on the known (or derived) scale of the images, the stereophotogrammetric analysis can provide dimensional information for each feature in the images (including the rails themselves, and more importantly in some cases, their relative disposition). For example, at block 410, the method 400 comprises identifying, within a captured image (which might be two or more stereoscopic images of the same scene, as noted above) a location of an edge (e.g., an inside edge) or a corner (e.g., an inside-upper corner) of each of the rails to be monitored. Conventional edge-detection image processing techniques can be used to identify such locations within the image.

Once the location of the rail edge(s)/corner(s) is known, a variety of different types of analysis can be undertaken. For example, the path of a rail edge/corner within the image can be analyzed to determine if the rail has become displaced. In some embodiments, the path of the rail edge/corner can be compared with earlier-collected data (or baseline data) to determine if the rail's location has changed over time.

As another example, once an edge/corner of two (or more) different rails has been identified, the inter-rail spacing (gauge) can be calculated based on the distance between those two edges. Likewise, the relative elevation/height of two rails (and/or a slope between the two rails) can be calculated, based on the locations of the respective corners of both rails. Thus, at block 415, the method 400 comprises calculating a distance between two or more rails; this distance can be calculated as a lateral distance, a difference in elevation, or a linear distance.

Returning to FIG. 2, once the rail configuration has been identified (using whichever technique is selected), the method 200 comprises associating that rail configuration with the location of the mobile platform (block 220), which, as noted above, might be determined by any of a variety of techniques. More precisely, in some embodiments, if the target point corresponds to a focus point of the image capture device(s) that capture the railway images, associating a rail configuration with the location of the mobile platform might comprise associating the rail configuration identified from the captured images with the location (to within whatever degree of precision is available and/or desired) of the section of railway depicted in the captured image(s). In one embodiment, the identified rail configuration might be embodied as data (either comprising the captured railway image(s) or comprising results, e.g., numerical results, of the analysis of the captured image(s), and the location might also be embodied as data (e.g., coordinate references, etc.), and these two sets of data can be associated in any of a variety of fashions.

Merely by way of example, in some embodiments, data about the rail configuration, and/or associated data about the mobile platform's location, can be stored in a data store (block 225), which might be a database, file system, etc., and which might be local to a computer system on the mobile platform or might be located elsewhere. The association between the identified rail configuration and the corresponding location might comprise storing the two sets of data as fields in a single database record, storing the respective data in two separate, but related and/or linked database records, and/or the like. One skilled in the art should appreciate, from the disclosure herein, that there are a variety of known techniques for storing and/or associating two data sets, and that any of such techniques can be used in accordance with different embodiments.

At block 230, the method 200 comprises determining whether the rail configuration is satisfactory. In one aspect, determining whether the rail configuration is satisfactory might comprise comparing the identified rail configuration (which, as noted above, might be expressed as numerical data) with a baseline rail configuration. Merely by way of example, if the railway is designed to a standard gauge that is specified by nominal values for inter-rail distance, the inter-rail distance measured from the captured images might be analyzed to determine whether it falls within those nominal values. As another example, the baseline rail configuration might be expressed graphically, and the captured image of the rails might be compared to determine whether the captured image matches the baseline image to within a specified tolerance. This procedure might be performed automatically (e.g., without human interaction), visually by an operator (e.g., using an image overlay of the current rail configuration and the baseline rail configuration), and/or the like.

In some cases, the baseline rail configuration might be a previously-identified rail configuration for the same section of track that is being monitored (based, for example, on a previous monitoring operation). Thus, the current rail configuration can be compared (e.g., either numerically or graphically, as described above) with a previous rail configuration, to identify any degradation or other changes to the rail configuration over time. Accordingly, the computer system might store records of rail configurations (and/or their associated locations) over a period of time, to allow such chronological comparison. This functionality can allow the identification of potential degradation over time. For example, even if the current rail configuration remains within tolerances, minor changes from a previously identified configuration might indicate the potential for future changes that would render the rail configuration outside of acceptable tolerances. (In such case, the identified configuration might be deemed unsatisfactory even if still within tolerances, in order to allow more thorough inspection and/or repair of that portion of the railway before the rail configuration degrades to the point that it causes an unsafe condition.)

At block 235, the method 200 comprises generating an alert if the rail configuration is determined to be unsatisfactory. There are many different ways in which an alert can be generated, in accordance with various embodiments. As a simple example, a computer system (which could be a computer system that's part of the monitoring system on the mobile platform and/or could be a computer system at a remote location) might sound a tone with a speaker device and/or display a visual alert with a display device to indicate the detection of an unsatisfactory rail configuration. As noted above, a computer system on a mobile platform might be in communication with one or more other computer systems via any of several available communication networks (such as a private network, the Internet, etc.), and another example of generating an alert might comprise transmitting data to one or more other computer systems via such a network. Merely by way of example, many railroads maintain operations centers, where human operators monitor railroad system conditions, and a computer system on the mobile platform might transmit data to such an operation center, where an alert may be generated and/or distributed for review by one or more operators. Other examples exist as well: in some cases, a computer system (which might be either a monitoring system as described above or a computer system in communication with such a monitoring system) might be configured to send electronic mail messages to appropriate personnel upon receiving data indicating an unsatisfactory rail condition; in other cases, generating an alert might comprise interfacing with a railroad's system-wide monitoring system to utilize whatever alert framework is provided by that system-wide monitoring system; in yet other cases, generating an alert may comprise generating a record in a database, which could be reviewed at a later time, either by human operator and/or by an automated process. Based on the disclosure herein, one skilled in the art can appreciate that there are a variety of techniques for generating alerts, and that any such appropriate technique can be used in accordance with different implementations.

Figure 5:
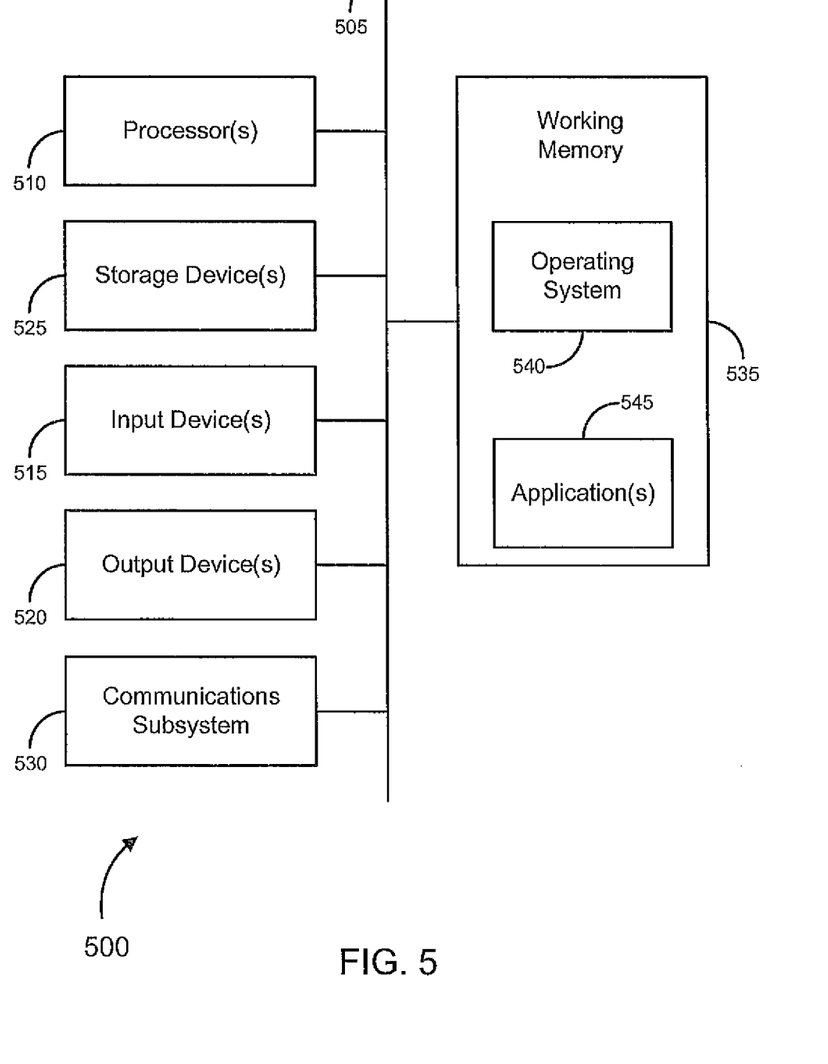
FIG. 5 is a generalized schematic diagram illustrating a computer system, in accordance with various embodiments.

FIG. 5 provides a schematic illustration of one embodiment of a computer system 500 that can perform the methods provided by various other embodiments, as described herein, and/or can function as the computer system 160 described above and/or as a remote computer system. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the networks described above), with other computer systems, and/or with any other devices described herein. In many embodiments, the computer system 500 will further comprise a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 525. Volatile media includes, without limitation, dynamic memory, such as the working memory 535. Transmission media includes, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a solid state memory, a floppy disk, a flexible disk, a hard disk, magnetic tape, or any other magnetic medium, a CD-ROM, any other optical medium, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    capturing, with a first image capture device mounted on a mobile platform configured for movement along a railway comprising one or more rails, a series of position reference images as the mobile platform travels along the railway;
    identifying, in at least one position reference image, a visual target positioned proximate to the railway;
    determining a distance from the mobile platform to the visual target;
    calculating, at a computer system, a location of the mobile platform on the railway, based at least in part on the determined distance from the mobile platform to the visual target;
    capturing, with a second one or more image capture devices, one or more railway images of the one or more rails;
    performing, at the computer system, photogrammetric analysis on at least one of the one or more rail images to identify a rail configuration of the railway, wherein the railway comprises a plurality of rails and the photogrammetric analysis on at least one of the one or more rail images comprises:
        identifying, in the at least one image, a location of a first edge of a first rail;
        identifying a location of a second edge of a second rail; and
        calculating a distance between the rails, based on the location of the first edge of the first rail and the location of the second edge of the second rail;
    associating the rail configuration with the location of the mobile platform on the railway; and
    storing, in a data store, a data record comprising data about the rail configuration and the associated location of the mobile platform.

2. The method of claim 1, wherein determining a distance from the mobile platform to the visual target comprises:
    activating an electronic distance measurement system on the mobile platform, based on an identification of the visual target; and
    measuring, with the electronic distance measurement device, a distance from the mobile platform to the visual target.

3. The method of claim 1, wherein calculating a location of the mobile platform comprises calculating a position of a target point with a known position relative to the mobile platform.

4. The method of claim 3, wherein the target point is a point within the field of view of at least one of the second one or more image capture devices.

5. The method of claim 1, wherein calculating a location of the mobile platform on the railway comprises calculating the location of the mobile platform based at least in part on the determined distance from the mobile platform to the visual target and at least in part on a position solution obtained from a global network satellite system ("GNSS").

6. The method of claim 1, further comprising:
    activating the second one or more image capture devices, to capture the one or more railway images, based at least in part on the calculated location of the mobile platform.

7. The method of claim 1, wherein the first one or more image capture devices and the second one or more image capture devices are the same one or more image capture devices.

8. The method of claim 1, wherein the rail configuration comprises a dimension metric.

9. The method of claim 1, further comprising:
    determining whether the rail configuration is satisfactory.

10. The method of claim 9, further comprising:
    generating an alert if the rail configuration is determined to be unsatisfactory.

11. The method of claim 9, wherein determining whether the railway configuration is satisfactory comprises comparing the data record with a previously-stored data record corresponding to the location of the mobile platform.

12. The method of claim 9, wherein determining whether the railway configuration is satisfactory comprises comparing the rail configuration with one or more nominal values for a satisfactory rail configuration.

13. The method of claim 1, wherein the rail configuration comprises an inter-rail spacing between two or more of the plurality of rails.

14. The method of claim 1, wherein the rail configuration comprises a slope between two or more of the plurality of rails.

15. The method of claim 1, wherein the rail configuration comprises an elevation of at least one of the plurality of rails.

16. The method of claim 1, wherein the computer system is located on the mobile platform.

17. The method of claim 1, wherein the mobile platform is a railway car in service.

18. A railway track monitoring system, comprising:
    a mobile platform configured for movement along a railway comprising one or more rails;
    a first image capture device, mounted on the mobile platform, for capturing a series of position reference images as the mobile platform travels along the railway;
    a second one or more image capture devices for capturing one or more railway images of the one or more rails;
    a data store for storing railway configuration data; and
    a computer system comprising one or more processors and one or more computer readable storage media having encoded thereon a set of instructions operable by the one or more processors to cause the computer system to perform one or more operations, the set of instructions comprising:
        instructions for identifying, in at least one position reference image, the visual target;
        instructions for determining a distance from the mobile platform to the visual target;
        instructions for calculating a position of the mobile platform, based at least in part on the determined distance from the mobile platform to the visual target;

instructions for performing photogrammetric analysis on at least one of the one or more rail images to identify a rail configuration of the railway, wherein the railway comprises a plurality of rails and the photogrammetric analysis on at least one of the one or more rail images comprises:
  identifying, in the at least one image, a location of a first edge of a first rail;
  identifying a location of a second edge of a second rail; and
  calculating a distance between the rails, based on the location of the first edge of the first rail and the location of the second edge of the second rail;
instructions for associating the rail configuration with the location of the mobile platform on the railway; and
instructions for storing, in the data store, a record comprising data about the rail configuration and the associated location of the mobile platform.

19. An apparatus, comprising:
a non-transitory computer readable medium having encoded thereon a set of instructions executable by one or more computers to perform one or more operations, the set of instructions comprising:
  instructions for identifying, in at least one position reference image captured by a first image capture device mounted on a mobile platform configured for movement along a railway comprising one or more rails, a visual target positioned proximate to the railway;
  instructions for determining a distance from the mobile platform to the visual target;
  instructions for calculating a position of the mobile platform, based at least in part on the determined distance from the mobile platform to the visual target;
  instructions for performing photogrammetric analysis on one or more rail images, captured by a second one or more image capture devices, to identify a rail configuration of the railway, wherein the railway comprises a plurality of rails and the photogrammetric analysis on at least one of the one or more rail images comprises:
    identifying, in the at least one image, a location of a first edge of a first rail;
    identifying a location of a second edge of a second rail; and
    calculating a distance between the rails, based on the location of the first edge of the first rail and the location of the second edge of the second rail;
  instructions for associating the rail configuration metric with the location of the mobile platform on the railway; and
  instructions for storing, in a data store, a record comprising data about the rail configuration and the associated location of the mobile platform.

20. A computer system, comprising:
one or more processors; and
a non-transitory computer readable medium in communication with the one or more processors, the computer readable medium having encoded thereon a set of instructions executable by the computer system to perform one or more operations, the set of instructions comprising:
  instructions for identifying, in at least one position reference image captured by a first image capture device mounted on a mobile platform configured for movement along a railway comprising one or more rails, a visual target positioned proximate to the railway;
  instructions for determining a distance from the mobile platform to the visual target;
  instructions for calculating a position of the mobile platform, based at least in part on the determined distance from the mobile platform to the visual target;
  instructions for performing photogrammetric analysis on one or more rail images, captured by a second one or more image capture devices, to identify a rail configuration of the railway, wherein the railway comprises a plurality of rails and the photogrammetric analysis on at least one of the one or more rail images comprises:
    identifying, in the at least one image, a location of a first edge of a first rail;
    identifying a location of a second edge of a second rail; and
    calculating a distance between the rails, based on the location of the first edge of the first rail and the location of the second edge of the second rail;
  instructions for associating the rail configuration metric with the location of the mobile platform on the railway; and
  instructions for storing, in a data store, a record comprising data about the rail configuration and the associated location of the mobile platform.

21. A method, comprising:
determining a location of a mobile platform configured for movement along a railway comprising one or more rails;
capturing, with a first one or more image capture devices, one or more railway images of the one or more rails;
performing, at the computer system, photogrammetric analysis on at least one of the one or more rail images to identify a rail configuration of the railway, wherein the railway comprises a plurality of rails and the photogrammetric analysis on at least one of the one or more rail images comprises:
  identifying, in the at least one image, a location of a first edge of a first rail;
  identifying a location of a second edge of a second rail; and
  calculating a distance between the rails, based on the location of the first edge of the first rail and the location of the second edge of the second rail;
associating the rail configuration with the location of the mobile platform on the railway; and
storing, in a data store, a record comprising data about the rail configuration and the associated location of the mobile platform.

22. The method of claim 21, wherein determining a location of the mobile platform comprises:
  capturing, with a second image capture device mounted on the mobile platform, a series of position reference images as the mobile platform travels along the railway;
  identifying, in at least two position reference images, a visual target positioned proximate to the railway;
  determining a position of the mobile platform relative to the visual target, based on analysis of the location of the visual target in the at least two position reference images; and calculating, at a computer system, a location of the mobile platform on the railway, based at least in part on determined position of the mobile platform relative to the visual target.

23. The method of claim 21, wherein determining a location of the mobile platform comprises determining the location based at least in part on information received by a global navigation satellite system ("GNSS") receiver.

24. The method of claim 21, wherein determining a location of the mobile platform comprises determining the location based at least in part on inertial measurements.

25. The method of claim 21, wherein determining a location of the mobile platform comprises determining the location based at least in part on image-based motion tracking.

26. The method of claim 25, wherein the image-based motion tracking comprises performing reverse photogrammetry on at least some of the one or more railway images.

* * * * *